United States Patent [19]
Ollfisch et al.

[11] Patent Number: 5,441,551
[45] Date of Patent: Aug. 15, 1995

[54] BENDING PRESS FOR THE PRODUCTION OF CURVED GLASS PANES

[75] Inventors: Karl-Josef Ollfisch; Hans-Werner Kuster; Hans-Werner Nowoczyn; Horst Mucha, all of Aachen; Eberhard Taubert, Herzogenrath, all of Germany

[73] Assignee: Saint-Gobain Vitrage International, Courbevoie, France

[21] Appl. No.: 269,622

[22] Filed: Jul. 1, 1994

Related U.S. Application Data

[63] Continuation of Ser. No. 31,723, Mar. 15, 1993, abandoned.

[30] Foreign Application Priority Data

Mar. 14, 1992 [DE] Germany ............... 42 08 219.6

[51] Int. Cl.$^6$ ................ C03B 11/17; C03B 35/20
[52] U.S. Cl. ............................ 65/162; 65/356; 65/374.13; 65/289
[58] Field of Search ............ 65/104, 106, 162, 273, 65/289, 356, 374.13, DIG. 4

[56] References Cited

U.S. PATENT DOCUMENTS

| | | |
|---|---|---|
| 3,253,898 | 5/1963 | Leflet . |
| 3,278,288 | 10/1966 | Leflet . |
| 3,418,098 | 12/1968 | Kirkmann ............... 65/106 |
| 3,846,104 | 1/1973 | Seymour ............... 65/273 |
| 3,847,586 | 11/1974 | Reese ............... 65/DIG. 4 |
| 4,184,864 | 1/1980 | Reese ............... 65/DIG. 4 |
| 4,339,259 | 7/1982 | Paudke ............... 65/104 |
| 4,539,031 | 9/1985 | Fecik ............... 65/29 |
| 4,812,372 | 3/1989 | Kithany ............... 65/374.12 |
| 5,009,694 | 4/1991 | Nishitani ............... 65/115 |
| 5,053,069 | 10/1991 | Vanoschen ............... 65/106 |
| 5,178,660 | 1/1993 | Wampler ............... 65/356 |
| 5,279,635 | 1/1994 | Flaugher ............... 65/104 |

*Primary Examiner*—W. Gary Jones
*Assistant Examiner*—John Hoffmann
*Attorney, Agent, or Firm*—Oblon, Spivak, McClelland, Maier, & Neustadt

[57] ABSTRACT

A device for pressing and bending glass panes comprises an upper, solid-faced bending mold and a lower frame-shaped mold. The lower frame mold is mounted horizontally traversable and serves at the same time as a support ring for transferring the bent glass pane into a cooling station. The frame-shaped mold is provided with an electrical heating resistor. In addition, a temperature sensor is disposed in the frame-shaped mold. The temperature of the frame-shaped mold can be regulated to a predetermined temperature by way of a power regulator, which is governed by the temperature sensor.

9 Claims, 2 Drawing Sheets

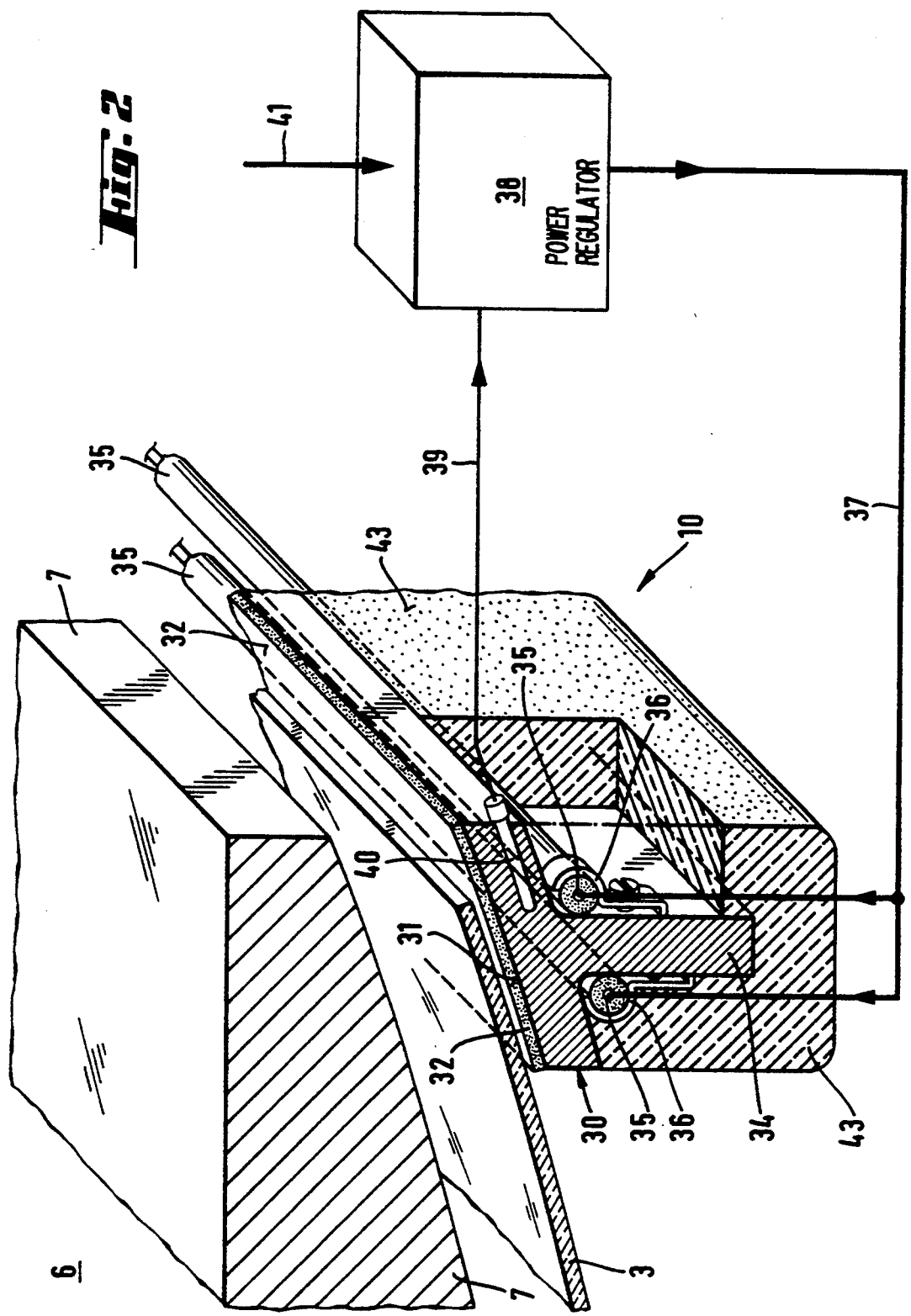

BENDING PRESS FOR THE PRODUCTION OF CURVED GLASS PANES

This application is a Continuation of application Ser. No. 08/031,723, filed on Mar. 15, 1993, now abandoned.

BACKGROUND OF THE INVENTION

1. Field of the Invention

The present invention relates to a process and a device for producing curved glass panes. The device includes a bending press, comprising an upper, solid-faced bending mold and a lower, horizontally movable frame-shaped mold, and a cooling station, in which the bent glass panes are cooled as they lie on the movable frame-shaped mold.

2. Description of the Related Art

Devices of this type are widely used for making monolithic safety glass panes of toughened glass for the automobile industry. In this case the cooling station contains blowing boxes, by means of which the glass panes are rapidly cooled by air over their entire surface at a high rate of cooling. By the accelerated cooling, all over the glass sheet except the region bordering the glass sheet, high compressive stresses result in the surface layers of the glass panes, and these are compensated by high tensile stresses in the core. The thickness stress distribution is isotropic, i.e., the integral of the stresses along the thickness is zero. In the region bordering the edges, the integral of the stresses is no longer zero but leads to a preponderance of compressive stresses known as edge stresses.

Devices of the aforementioned type may, however, be used also for fabricating curved automobile glass panes of laminated safety glass. Laminated safety glass panes consist of two relatively thin single glass sheets which, after they have been bent, are bonded together by a film of thermoplastics. The two single glass sheets may be bent individually or as a matching pair. The cooling of the glass sheets after bending takes place relatively slowly, because the glass sheets should be substantially free of stresses. This cooling is generally achieved in an annealing station in which occurs the relaxation of the internal stresses induced during the bending step. But this annealing does not prevent a more pronounced cooling of the edges in order of generating edge stresses, to increase the mechanical strength and the thermal resistance of the peripheral zone.

From DE 26 40 206 C2, it is known, for example, to cool the glass sheets with a thickness of 1.5 to 2.5 mm in the peripheral zone at a rate of cooling of 85 to 150 degrees/min, in order to thereby generate edge compressive stresses of 1,960 to 3,430 $N/cm^2$ in the peripheral region.

The edge stresses generated in the peripheral region are compensated by tensile stresses, which form in the zone adjacent to the compressively stressed peripheral zone. These tensile stresses in the zone adjacent to the peripheral zone can, in the case of laminated glass panes, lead to a weakening of the glass pane and for this reason must not exceed a specified maximum value.

Due to an inherent limitation of the edge stresses, the limitation of the tensile stresses in the edge region of the glass sheets does not present any difficulties in the bending method most commonly used at present for laminated glass, in which the pair of single glass sheets, resting on a frame-shaped bending mold, are moved through a bending furnace, in which they become curved under the effect of their own weight. It has been found, however, that it is relatively difficult to produce curved glass sheets for laminated glass with the desired tensile stress state in the edge region by means of a pressing bending device of the initially named type.

SUMMARY OF THE INVENTION

An object of the present invention is to further develop a bending process and a bending device for glass sheets or panes of the initially named type so that the production of curved glass sheets, intended for the production of laminated glass, having edge stresses of a desired value shall be possible in an intentional and reproducible procedure.

According to the invention, this object is achieved in that the temperature of the frame-shaped mold is controlled during the bending step and the transferring step. A device according the invention comprises a frame-shaped mold provided with an electrical heating resistor, by which it can be heated to a predetermined temperature.

The invention derives from the knowledge that the mass and temperature of the frame-shaped mold during bending and during the later cooling of the glass pane are of importance for determining the rate of cooling of the glass pane and therefore the level of edge compressive and tensile stresses in the edge region. Since, in bending by means of the device of this category, the glass sheet already heated to bending temperature does not come into contact with the frame mold until in the bending press, whereas the frame mold for its part, however, has previously transferred the preceding glass sheet into the cooling station and has been cooled down there together with it, different conditions are obtained in this case from those in continuous bending on a bending frame under the action of the self-weight of the glass sheets. By the heating according to this invention, of the frame-shaped mold to a predetermined temperature, it is however possible to produce basically similar cooling conditions in the edge region of the glass sheets as in the aforementioned, continuous bending under the action of the self-weight.

It has been found that good results with respect to the stress state in the edge zone in the case of laminated glass panes can be achieved if the temperature of the bending frame which, depending upon the construction of the device and the particular procedure used, would be about 100 to 200 degrees Celsius without the heating according to this invention, is raised by the electrical heating in such a way that, during the pressing operation and during the transfer of the bent glass pane into the cooling station, has a value between 250 and 400 degrees Celsius. The temperature desired in the individual case within this temperature range can be determined by a few tests.

The device according to this invention is, however, advantageous not only for the creation of defined, uniaxial stresses in the edge region in the case of laminated glass panes, but also makes possible an improvement in the form stability of the glass sheets, an advantage which is of importance also in the production of single sheet safety glass, that is glass sheets having a biaxial stress state over their entire area. It is known that the temperature, due to the thermal expansion, exerts an influence upon the accuracy of form of the bending molds. This change in shape, caused by the working temperature, must be compensated in the manufacture of the bending molds. If, however, as in a device of the present category, the operating temperature of the frame mold is not known or is subject to wide fluctuations, then an accurate compensation of the temperature-dependent change in shape is not possible. According to this invention, however, the frame mold may have a preselected, constant operating temperature, so that in this case an exact compensation of the temperature-dependent change of shape is possible.

In a further embodiment of the invention, the frame mold is furthermore provided with a temperature sensor, which governs a power regulator which regulates the electrical heating current for the resistance heating. In this way the temperature of the frame mold can be regulated to the desired temperature within a comparatively narrow temperature range, with the result that an especially high constancy of the desired stress values and an especially high accuracy of shape of the frame mold are achieved.

Accordingly, the present invention provides for a process for the production of curved glass panes in which glass sheets are heated, one after another, to a bending temperature. The process comprising the steps of pressing a heated glass heat between an upper faced bending mold and a movable lower frame shaped mold to bend the glass sheet; transferring the glass sheet while positioned on the lower frame shaped mold to a cooling station; and maintaining a temperature of the lower frame-shaped mold at a predetermined temperature during the pressing step and the transferring step.

The present invention also provides for a device for the production of curved glass panes. The device comprising a bending press having an upper solid-faced bending mold and a lower horizontally traversable frame-shaped mold for bending a glass sheet; and a cooling station for cooling the bent glass sheet while the glass sheet rests on the lower traversable frame-shaped mold. The lower frame-shaped mold comprising an electrical heating resistor for heating the lower frame-shaped mold to a specified temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows the construction of the lower frame-shaped mold in a partial sectional drawing.

DESCRIPTION OF THE PREFERRED EMBODIMENTS

Figure 1:
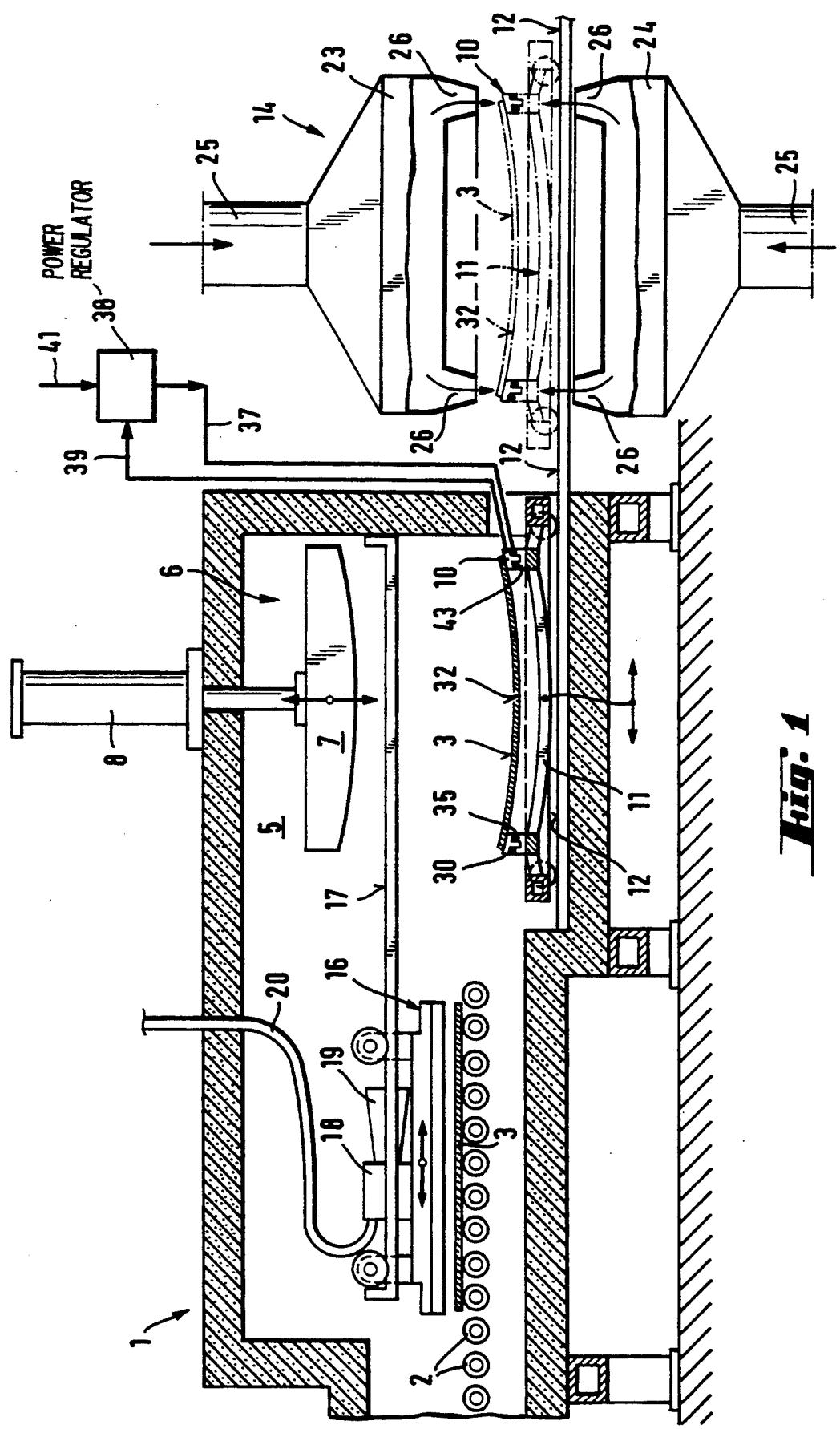
FIG. 1 shows a plant for the production of curved glass sheets, in its entirety.

Referring now to the drawings, wherein like reference numerals designate identical or corresponding parts throughout the several views, and more particularly to FIG. 1 thereof, a plant for bending glass sheets and subsequent cooling is illustrated. The plant comprises a roller straight-through furnace 1 with a conveying path formed of driven conveying rollers 2. In the roller straight-through furnace 1, the flat glass sheets 3 are heated to their bending temperature. The roller furnace 1 is adjoined by a transfer and bending chamber 5. In this transfer and bending chamber 5 is situated the bending press 6. The bending press 6 comprises the upper solid-faced bending mold 7, which can be moved up and down by means of a suitable actuating device, in the case illustrated the pressure cylinder 8. The press also comprises a lower frame-shaped or annular-shaped mold 10, which is disposed on a traversable trolley 11. The trolley 11 is traversable on rails 12 into the cooling station 14, disposed adjacent to the bending chamber.

The transfer device for transferring the glass sheets 3, heated to bending temperature, from the conveying rollers 2 into the bending press 6, comprises a suction plate 16, which is traversable on rails 17. The suction plate 16 is subjected to vacuum by means of the blower 18 and the venturi nozzle 19, for the purpose of suction lifting the glass sheets 3. In the bending press 6, the glass sheets 3 are released by the suction plate 16 and laid on the frame mold 10, by temporarily subjecting the suction plate 16 to above-atmospheric pressure through the compressed air line 20.

When the glass sheets 3 have been bent by the bending press 6, they are transferred, resting on the frame-shaped mold 10, into the cooling station 14. In the cooling station 14 two blowing boxes 23, 24 are disposed, which are supplied with air through pipelines 25. The blowing boxes have annular slit-shaped nozzles 26, which correspond approximately to the shape of the glass sheets and by means of which the bent glass sheets are cooled at a higher cooling rate in the edge region than in the central area.

The construction of the frame-shaped mold 10 is shown in greater detail in FIG. 2. The frame mold 10 possesses a metal core 30 having a substantially T-shaped cross-section. The metal core 30 is preferably of a heat-resistant steel alloy or cast iron alloy. The upper mold surface 31 corresponds, at the operating temperature of the bending press, with a high degree of accuracy to the desired shape of the bent glass pane, but obviously taking into account the reverse deformation of the glass pane after the pressing operation as a consequence of the elastic component of the deformation. On the mold surface 31 there is an elastic facing 32, for example of a metal fiber felt.

On one or both sides of a vertical part or central web 34 of the metal core 30, electrical heating resistors, for example, in the form of sheathed heating conductors 35, are disposed extending all around the entire periphery of the frame mold and are fixed by cable clips 36. Suitable sheathed heating conductors 35 consist of a resistance heating wire as the core, of an insulating layer encasing the resistance heating wire, for example of ceramic beads, and of an outer sheath of a suitable metal. The sheathed heating conductors 35 are connected to a heat-resistant cable 37, which is constructed as a trailing cable and leads to a power regulator 38, located outside the hot zone. A signal line 39 also leads to the power regulator. This signal line 39 is connected to a thermocouple 40, housed in a bore in the metal core 30 of the frame-shaped mold 10. While the actual value of the temperature governs the power regulator 38 via the signal line 39, the desired temperature set-point is input via the line 41, so that in this manner the temperature of the frame-shaped mold 10 is regulated to the desired value.

The vertical part or central web 34 of the metal core 30 of the frame-shaped mold is surrounded on all sides by a thermally insulating jacket 43 of a suitable insulating material. This insulating jacket 43 prevents excessive cooling down of the frame-shaped mold in the cooling station and thus contributes to the temperature constancy of the frame mold within a narrow temperature range.

According to a further embodiment, the mold surface 31 of the metal core 30 is provided with an overcoating comprising a heating ceramic layer. The overcoating can be a stack comprising, (beginning from the mold surface 31) an anchoring layer which permits a compensation of the difference between the dilatation coefficient of the metal core 30 and the dilatation coefficient of the ceramic layer, an insulation layer (a ceramic layer), another insulation layer part in contact with the glass pane and a surface layer.

The following stack can be used: Ni—Al (130 microns), $Al_2O_3$ (330 microns), $MoSi_2$ (90 microns–130 microns, the thickness may be locally different in order of a locally differentiated heating), $ZrO_2$—$Y_2O_3$ (70 microns) and finally a layer of aluminum (40 microns).

The layers are deposited for example by a flame torch or a plasma torch. The layer stack permits the achievement of a temperature of about 650° C. with an applied tension less than 42 Volts.

It must be emphasized that this heating overcoating does not prevent the metal core 30 from being heated by the electrical heating resistor 35, in view of avoiding the generation of stresses in the frame-shaped mold. The glass sheet can be directly in contact with the overcoating or an elastic facing 32 can be interposed between them.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for the production of curved glass panes, comprising:
    a bending press having an upper solid-faced bending mold and a lower horizontally traversable ring mold for bending a glass sheet; and
    a cooling station for cooling the bent glass sheet while the glass sheet rests on the lower traversable ring mold, wherein said ring mold transfers said bent glass sheet from said bending press to said cooling station; wherein;
    the lower ring mold comprises an electrical heating resistor for heating the lower ring mold to a specified temperature, and said specified temperature is maintained during a pressing of said glass sheet by said bending press and during the transfer of the bent glass sheet from the bending press to the cooling station; and
    the ring mold further comprises a metal core having a vertical central part, and an additional electrical heating resistor, wherein such electrical heating resistors are disposed on each side of the vertical central part of the ring mold.

2. The device according to claim 1, wherein the vertical central part of the ring mold is surrounded by a thermally insulating jacket.

3. The device according to one of claims 1 or 2, wherein a temperature sensor is disposed in the metal core of the ring mold.

4. The device according to claim 3, further comprising regulator means responsive to a temperature signal from the temperature sensor for regulating the temperature of the ring mold.

5. The device according to claim 4, wherein a mold surface of the ring mold is provided with an overcoating comprising a ceramic layer for heating.

6. The device according to claim 5, wherein said ceramic layer is made of $MoSi_2$, with a thickness of between 90 microns and 130 microns.

7. The device according to claim 6, wherein a thickness of the ceramic layer varies.

8. The device according to claim 1, wherein said specified temperature is between 250° and 450° C.

9. A device for the production of curved glass panes, comprising:
    a bending press having an upper solid-faced bending mold and a lower horizontally traversable mold for bending a glass sheet; and
    a cooling station for cooling the bent glass sheet while the bent glass sheet rests on said lower traversable ring mold; wherein:
    the ring mold transfers said bent glass sheet from the bending press to said cooling station;
    the ring mold comprises an electrical heating resistor for heating the ring mold to a specified temperature;
    the ring mold comprises a metal core having a first part and a second part extending from a center of said first part, and an additional electrical heating resistor, such that said electrical heating resistors are disposed on opposing sides of said second part of the ring mold;
    a mold surface of the ring mold comprises an overcoating having a ceramic layer for heating.

* * * * *